(12) United States Patent
Slee et al.

(10) Patent No.: US 9,977,819 B2
(45) Date of Patent: May 22, 2018

(54) SHARING DATA ON MOBILE DEVICES

(75) Inventors: Thomas Stephen Slee, Waterloo (CA); James David Graham, Waterloo (CA); Adam Hurst, Waterloo (CA)

(73) Assignee: iAnywhere Solutions, Inc., Dublin, CA (US)

( * ) Notice: Subject to any disclaimer, the term of this patent is extended or adjusted under 35 U.S.C. 154(b) by 687 days.

(21) Appl. No.: 12/852,948

(22) Filed: Aug. 9, 2010

(65) Prior Publication Data
US 2012/0036199 A1 Feb. 9, 2012

(51) Int. Cl.
*G06F 17/30* (2006.01)

(52) U.S. Cl.
CPC ........ *G06F 17/30575* (2013.01); *G06F 17/30* (2013.01)

(58) Field of Classification Search
CPC .......................... G06F 17/30; G06F 17/30575
USPC .......................... 707/768–772; 709/206, 207
See application file for complete search history.

(56) References Cited

U.S. PATENT DOCUMENTS

| | | | |
|---|---|---|---|
| 6,735,605 B2 * | 5/2004 | Bird et al. | |
| 7,398,164 B2 * | 7/2008 | Ogushi et al. | 702/42 |
| 2001/0047363 A1 * | 11/2001 | Peng | 707/104.1 |
| 2002/0059280 A1 * | 5/2002 | Slesinsky | 707/100 |
| 2002/0078058 A1 * | 6/2002 | Bird et al. | 707/100 |
| 2003/0009753 A1 * | 1/2003 | Brodersen et al. | 717/172 |
| 2003/0023591 A1 * | 1/2003 | Ma et al. | 707/6 |
| 2003/0208416 A1 * | 11/2003 | Watters | 705/28 |
| 2005/0027715 A1 * | 2/2005 | Casey | G06F 17/30017 |
| 2005/0065939 A1 * | 3/2005 | Miao | 707/100 |
| 2005/0185660 A1 | 8/2005 | Ekberg et al. | |
| 2007/0005632 A1 * | 1/2007 | Stefani | G06F 17/30911 |
| 2007/0015498 A1 | 1/2007 | Giacalone et al. | |

(Continued)

FOREIGN PATENT DOCUMENTS

EP 2182695 A1 11/2008

OTHER PUBLICATIONS

International Search Report & Written Opinion of the International Search Authority for PCT/US2011/046,111, Ianywhere Solutions, Inc. et al., dated Jan. 18, 2012, Korean Intellectual Property Office, Republic of Korea, filed Aug. 1, 2011.

(Continued)

*Primary Examiner* — Aleksandr Kerzhner
*Assistant Examiner* — Matthew J Ellis
(74) *Attorney, Agent, or Firm* — Sterne, Kessler, Goldstein & Fox, PLLC

(57) ABSTRACT

System, methods and articles of manufacture for replicating relational data on multiple nodes. An embodiment comprises receiving an update request message from a node, wherein the update request message comprises a node identification and an application identification, accessing an application schema based on the application identification, identifying a partition residing in the application schema based on the node identification, accessing a server schema, identifying a second partition residing in the server schema based on the application identification, determining at least one data change stored in the second partition that changes data associated with the first partition, retrieving at least one data change from the second partition, formatting data change in an update response message, and transmitting the update response message to the node.

31 Claims, 10 Drawing Sheets

(56) References Cited

U.S. PATENT DOCUMENTS

| | | | |
|---|---|---|---|
| 2007/0190978 A1* | 8/2007 | White | H04L 51/14 |
| | | | 455/412.1 |
| 2008/0134211 A1* | 6/2008 | Cui | G06F 9/52 |
| | | | 719/318 |
| 2008/0214167 A1 | 9/2008 | Takeshi et al. | |
| 2008/0216092 A1* | 9/2008 | Serlet | 719/315 |
| 2009/0037492 A1 | 2/2009 | Baitalmal et al. | |
| 2009/0055553 A1* | 2/2009 | Chasman et al. | 709/248 |
| 2009/0094236 A1* | 4/2009 | Renkes | G06F 17/30336 |
| 2009/0131072 A1* | 5/2009 | Razdan et al. | 455/456.1 |
| 2009/0247134 A1* | 10/2009 | Jeide et al. | 455/414.2 |
| 2009/0307300 A1 | 12/2009 | David et al. | |
| 2010/0179940 A1* | 7/2010 | Gilder | G06F 17/30566 |
| | | | 707/622 |
| 2010/0205529 A1* | 8/2010 | Butin et al. | 715/704 |
| 2011/0060981 A1* | 3/2011 | Piersol et al. | 715/209 |
| 2011/0212770 A1* | 9/2011 | Ocko | A63F 13/12 |
| | | | 463/29 |

OTHER PUBLICATIONS

European Search Report directed toward related European Application No. 11816802.0, dated Nov. 10, 2014, 9 pages.
Ericsson et al., "SyncML Sync Protocol, Version 1.1", SyncML Sync Protocol, Feb. 15, 2002, pp. 1-62.
Open Mobile Alliance, "SyncML Device Management Protocol, Version 1.1.2", Open Mobile Alliance OMA-SyncML-DMProtocol-V1_1_2-20031203-A, Dec. 12, 2003, pp. 1-41.
Ericsson et al., "SyncML Representation Protocol, Version 1.0.1", SyncML Representation Protocol, Jun. 15, 2001, pp. 1-105.

\* cited by examiner

SHARING DATA ON MOBILE DEVICES

BACKGROUND OF THE INVENTION

Field of the Invention

The invention relates generally to mobile communication technology, and more particularly to replicating data among many mobile devices.

Description of the Background Art

Applications on mobile devices are natural extensions of desktop and web-based tools. People use mobile devices to communicate, email, and surf the Internet for popular websites such as Flicker, Facebook, Twitter, etc. As mobile devices such as smartphones become more commonplace, so is their use for desktop functions such as data sharing. Multiple applications designed for data sharing may be downloaded or accessed by connecting mobile devices to a communication network.

There are many conventional technologies for distributing and replicating data among mobile devices. For example, data may be replicated via a central server. Typically, a central server is operable to host a particular database application. Multiple mobile devices connect to the central server system via a communication network and allow users to use a web-based interface to post data and view data posted by other users. Having a user connect to the central server has benefits. For example, because all users post data to the central server, data is easily shared. Additionally, any changes or upgrades to applications or application databases need only be deployed on the central server.

However, the system described above has drawbacks, particularly when used from mobile devices over wireless networks. For example, users are likely to incur data communication charges while connecting to the application via a communication network. Also, a high latency wireless network can lead to a negative user experience. As a result, applications that require a reliable and fast network become unusable. Additionally, the lack of data storage on a mobile device means that all data must be stored on the central server, making it difficult for users to manipulate data quickly. Another side effect is decreased battery life on a mobile device. Finally, users cannot share data when their mobile devices are offline and do not have access to the communication network.

Other conventional systems allow users to locally store data on their mobile devices. Conventionally, those systems store data on mobile devices and post data to a central server for sharing with other users. When users make data changes on their mobile devices, the data changes are uploaded or posted to the central server. Users share data posted by other users to the central server either by explicitly requesting data from the central server or by having database applications on their mobile devices request data from the central server at times predetermined by the database application developer.

Storing data locally on a mobile device has benefits. Users are able to manipulate data when mobile devices are offline. Also, users' interaction with the application data is fast and efficient.

However, data stored locally on mobile devices is difficult to replicate in a consistent manner. Additionally, when application developers modify or upgrade database applications, the upgrade must be rolled out seamlessly to all mobile devices. For example, if a rollout is not seamless, mobile devices may reboot in the middle of a cell phone conversation, thereby resulting in a negative user experience. Also, users may experience busy intervals on their mobile devices, such as their mobile devices appearing frozen, because an upgrade is being downloaded from the web server.

Therefore, what is needed are systems and methods that allow mobile users to share data in a fast and efficient way. What is also needed are systems and methods where users do not incur network charges caused by frequent uploads and downloads of data. What is further needed are systems and methods that are able to incorporate multiple database applications into web technologies which are operable to provide a mechanism for instant and transparent deployment and immediate upgrades. What is also needed is a central server system operable to host multiple database applications on one server. Finally, what is needed are systems and methods that provide for a scheduling mechanism where mobile devices are operable to request data updates based on the amount of data posted to the central server by other mobile devices.

BRIEF SUMMARY OF THE INVENTION

Embodiments of the invention include a method for retrieving data from a central server system, comprising receiving an update request message from a node, wherein the update request message comprises a node identification and an application identification, and wherein the node comprises a computing device, an Internet browser and a database and wherein the application identification identifies a database application, accessing an application schema in a central database server based on the application identification, determining a partition of the application schema based on the node identification, determining a set of operations that describe data changes to the database application, retrieving at least one operation from the set of operations in the central database server that change data in the partition, formatting the at least one operation in an update response message and transmitting the update response message to the node.

Embodiments of the invention additionally include an article of manufacture including a computer-readable storage medium having stored thereon computer-executable instructions, execution of which, by one or more computing devices, causes the computing devices to perform operations comprises receiving an update request message from a node, wherein the update request message comprises a node identification and an application identification, and wherein the node comprises a computing device, an Internet browser and a database and wherein the application identification identifies a database application, accessing an application schema in a central database server based on the application identification, determining a partition of the application schema based on the node identification, determining a set of operations that describe data changes to the database application, retrieving at least one operation from the set of operations in the central database server that change data in the partition, formatting the operation in an update response message, and transmitting the update response message to the node.

Embodiments of the invention further include a system for replicating data, comprising a receiver, configured to receive an update request message from a node, wherein the update request message comprises a node identification and an application identification, wherein the node comprises a computing device, an Internet browser and a database and wherein application identification identifies a database application, a memory, configured to store an application schema and a set of operations, wherein the set of operations describe data changes made to the database application, a processor, configured to determine a partition of the application schema based on the node identification, the processor, further configured to determine at least one operation associated with the partition and retrieve the at least one operation, and a transmitter, configured to transmit the at least one operation to the node.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

Figure 1:
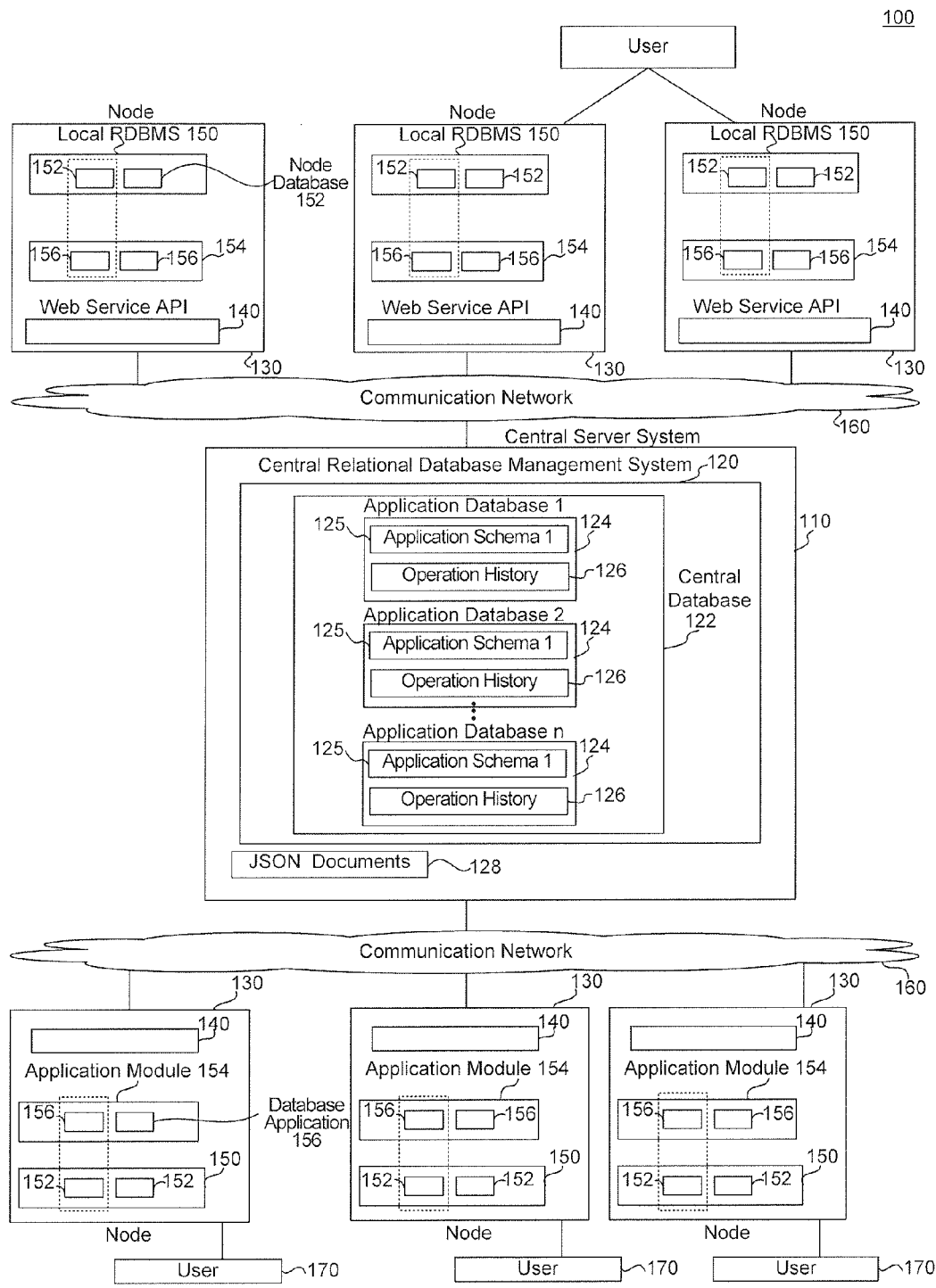
FIG. 1 is an exemplary operating environment 100 for replicating data among nodes, according to embodiments of the invention.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

1. Introduction

The following detailed description of the invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It will be apparent to a person skilled in the art that the invention, as described below, can be implemented in many different embodiments of software, hardware, firmware, and/or the entities illustrated in the figures. Any actual software code with the specialized control of hardware to implement the invention is not limiting of the invention. Thus, the operational behavior of the invention will be described with the understanding that modifications and variations of the embodiments are possible, given the level of detail presented herein.

The invention relates to systems, methods, and computer program products for replicating relational data among mobile devices. In an embodiment, a mobile device may have one or more nodes. As used herein, in an embodiment, a node is a computing component of a mobile device and is operable to host multiple applications on a mobile device, and is operable to store relational data locally. A node posts data to a central server system when a user commits data on the node. The central server system distributes relational data to multiple nodes by scheduling a time when each node may request data. The time is scheduled based on the frequency with which multiple users post data to the central server system.

FIG. 1 is an exemplary operating environment 100 for replicating data among mobile devices or nodes according to the embodiments of the invention. Operating environment 100 comprises a central server system 110, multiple nodes 130, multiple users 170 and a communication network 160. Each mobile device typically contains one node 130, but may contain more than one node 130. A central server system 110 is operable to communicate with nodes 130 via a communication network 160.

Figure 2A:
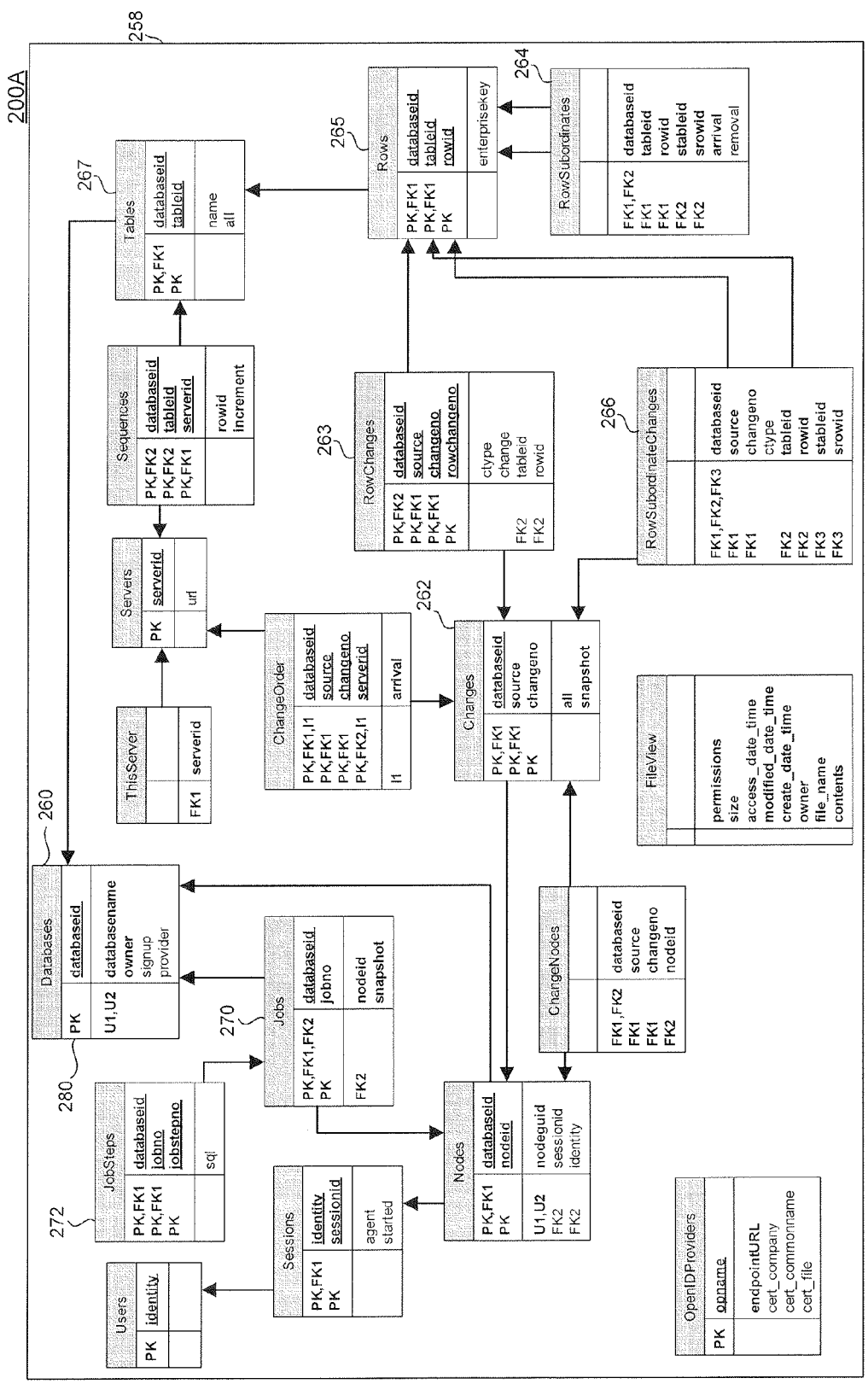
FIG. 2A is an exemplary embodiment of the server application schema according to embodiments of the invention.

Central server system 110 hosts a central relational database management system ("RDBMS") 120, such as, but not limited to SQL ANYWHERE®. In an embodiment, RDBMS 120 hosts at least one central database 122. Central database 122 comprises of relational database tables. The relational database tables are connected by unique, primary and foreign keys. In an illustrative embodiment, the schema of central database 122 is illustrated in FIG. 2A.

In an embodiment, central database 122 includes multiple application data sets 124 that are stored in its tables. Each application data set 124 corresponds to a database application 156 operable on multiple nodes 130. Application data set 124 is a union of all data that is stored on multiple nodes 130 for a particular application 156. Application data set 124 includes an application schema 125 and a structured history of operations 126 posted to central database 122 by multiple nodes 130.

In an embodiment, application schema 125 defines tables and relationships among tables that define a node database 152. Node database 152 is located on node 130 and includes a data set for a particular application 156. Node 130 is operable to download application schema 125 from central server system 110 prior to using database application 156. In an embodiment, node 130 uses the downloaded application schema 125 to define node database 152 in a local RDBMS 150.

In an embodiment, application data set 124 includes a structured history of operations 126. Structured history of operations 126 includes all operations, such as, but not limited to, ADD, DELETE and UPDATE operations that are posted to central server system 110 by multiple nodes 130.

As previously mentioned, central database 122 is operable to host data for multiple database applications 156 having distinct application schemas 124. A person skilled in the art will appreciate that the design of central database 122 allows the data for each database application 156 to be stored without any software code or configuration specific to each database application 156. Similarly, central server system 110 is operable to distribute data for particular database application 156 to multiple nodes 130 without using any software code or configuration specific to each database application 156.

In an embodiment, central server system 110 uses JSON or "JavaScript Object Notation" documents 128 to communicate information to node 130. JSON documents 128 are text representations of data, that for example, may include text representations of the data changes and application schemas 125 that are downloaded from central server system 110 to multiple nodes 130.

Central server system 110 communicates with multiple nodes 130 via a communication network 160. In an embodiment, communication network 160 may be, for example, a wired and/or wireless communication network. Communication network 160 is operable to post and download messages from multiple nodes 130 and central server system 110.

Mobile or computing devices may include, by way of example and not limitation, mobile devices such as the BLACKBERRY by RESEARCH IN MOTION of Waterloo, Ontario, Canada or the APPLE IPHONE by APPLE COMPUTER, INC. of Cupertino, Calif. One skilled in the relevant arts will recognize that techniques described herein as applicable to a node may also generally be applied to non-mobile devices as well, such as, for example, a personal computer or any other data processing device.

Node 130 is a mobile or other computing device operable to include local RDBMS 150, an Internet browser, a web service interface 140 and an application module 154. In an embodiment, a mobile or computing device that includes multiple Internet browsers and local RDBMSs 150 is operable to include multiple nodes 130.

In an embodiment, local RDBMS 150 includes multiple node databases 152. Each node database 152 corresponds to a particular application 156. The tables and relationships among the tables in node database 152 are defined by application schema 125 that is stored on central database 122. In an embodiment, tables comprising node database 152 are downloaded from a central server system 110, or another server.

Node database 152 stores data associated with one or more users 170. Users 170 use database application 156 to manipulate data in node database 152 on each of multiple nodes 130.

In an embodiment, local RDBMS 150 includes a database management system such as, but not limited to, SQLite. A local RDBMS 150 is operable to communicate with central server system 110 via database applications 156 and web service interface 140.

In an embodiment, by way of example and not limitation, an Internet browser may be any WebKit-based browser, Firefox, Internet Explorer or the BlackBerry OS 5.x browser. Node 130 uses the Internet browser to execute the software code for multiple applications 156.

Node 130 communicates with central server system 110 via function calls made to web service interface 140. Web service interface 140 is operable to access the communication network 160 to post and download data from central server system 110. When web service interface 140 receives data from central server system 110 it passes the data to node database 152.

Application module 154 stores multiple database applications 156. Database applications 156 may be included in a mobile or computing device when the mobile or computing device is purchased. In an embodiment, database applications 156 may be downloaded from a server, such as, for example, central server system 110.

In an embodiment, database application 156 includes software code, written, for example, in HTML, JavaScript and CSS.

In an embodiment, each database application 156 uses a particular node database 152 to store data on node 130, post data to central server system 110, and download data from central server system 110.

As discussed above, users 170 use nodes 130 to share data with other users 170. In an embodiment, user 170 may use multiple nodes 130 to access data on central server system 110. Before user 170 may obtain any data from central server system 110, user 170 must obtain a unique user name or user identification that authenticates user 170 with server system 110.

In an embodiment, user 170 may obtain a user identification such as an OpenID through an OpenID provider, such as, for example OpenID®. OpenID uniquely identifies user 170 with central server system 110. As described in detail below, application data set 124 requires a user identification number such as a userID to determine a partition for user 170. A partition for user 170 determines user's 170 access to data that is stored on central server system 110.

2. Central Database Design

Central RDBMS 120 located on central server system 110 is operable to host multiple application data sets 124. Each application data set 124 includes application schema 125 and structured history of operations 126 for each database application 156 posted to central server system 110 by nodes 130 and users 170.

As previously mentioned, application database schema 125 defines tables and relationships between the tables for node database 152. In an embodiment, application schema 125 is defined by an application developer. The application developer defines application schema 125 for application data set 124 using software languages. In an embodiment, an application developer may use software languages, such as, for example, XML. A person skilled in the art will understand that these software languages are listed by way of example and not limitation, and that other software languages may be used.

In an embodiment, application developer designs application schema 125 in a schema file. The schema file is then posted to central server system 110 by the application developer via, for example, communication network 160. In an embodiment, the schema file contains names of the tables, names of the columns in the tables, types of data stored in each column (such as, for example, a numeric or a text) and references to other tables in application schema 125.

Once application schema 125 is posted to the central server system 110, it is stored in central database 122. In an embodiment, application schema 125 is stored in a set of application-independent tables, such as Jobs Table 270 and JobsStep Table 272. Additionally, the table names and table IDs defined in application schema 125 are stored in a Tables Table 267. Tables Table 267 is one of the tables used to retrieve structured history of operations 126 described above. In an embodiment, the main table in application schema 125 is assigned the Table ID of "0".

A person skilled in the relevant art will appreciate that in such a design the tables defined in application schema 125 do not exist as tables in the central database 122. Central database 122 is therefore operable to host application data sets 124 and application schemas 125 for multiple database applications 156 without any application specific code.

In an embodiment, an application developer may post preloaded data associated with application data set 124. In an embodiment, preloaded data may be stored in a set of data files, such as comma-separated value (CSV) text files. In an embodiment, data in the CSV file may be in the same order as the columns in a table and have comma separated values for each row. In an embodiment, a data file is named after a table in application schema 125. For example, the file named TABLE_NAME.CSV contains data for TABLE_NAME, and TABLE_NAME corresponds to the table in application schema 125.

In an embodiment, the first table that is posted from the schema file is treated as the main table by central server system 110.

As discussed above, application schema 125 is described as a set of tables. The tables reference other tables in application schema 125 using primary and foreign keys. In relational databases, a primary key, is used to uniquely identify columns in a table where all records have distinct values. A foreign key identifies one or more columns in a first table that reference a matching set of columns in a second table. Primary keys and foreign keys are well known.

In an embodiment, the main table in application schema 125 is called a User Table. Each row in the User Table defines a name and other information for users 170 who access application schema 125. The User Table includes a unique user identification parameter, such as OpenID, described above.

In an embodiment, user 170 may use the same user identification, such as OpenID, to access multiple application schemas 125 that correspond to multiple application data sets 124.

In an embodiment, at least one primary key in the main table is set to reference a column associated with an entity that requires a partition. In application schema 125, a primary key is assigned to each user identification parameter, such as OpenID in the User Table. In an embodiment, user identification, such as OpenID, is a numeric number and is assigned a numeric primary key.

A partition is a set of rows in application schema 125 that belong to a particular user. For example, a partition in application schema 125 corresponds to a set of rows and tables that store data for user 170 having a particular OpenID. A partition may contain data for user 170 that is globally shared by all users 170, is unique to user 170, or is a subset of a group of users 170.

Figure 2B:
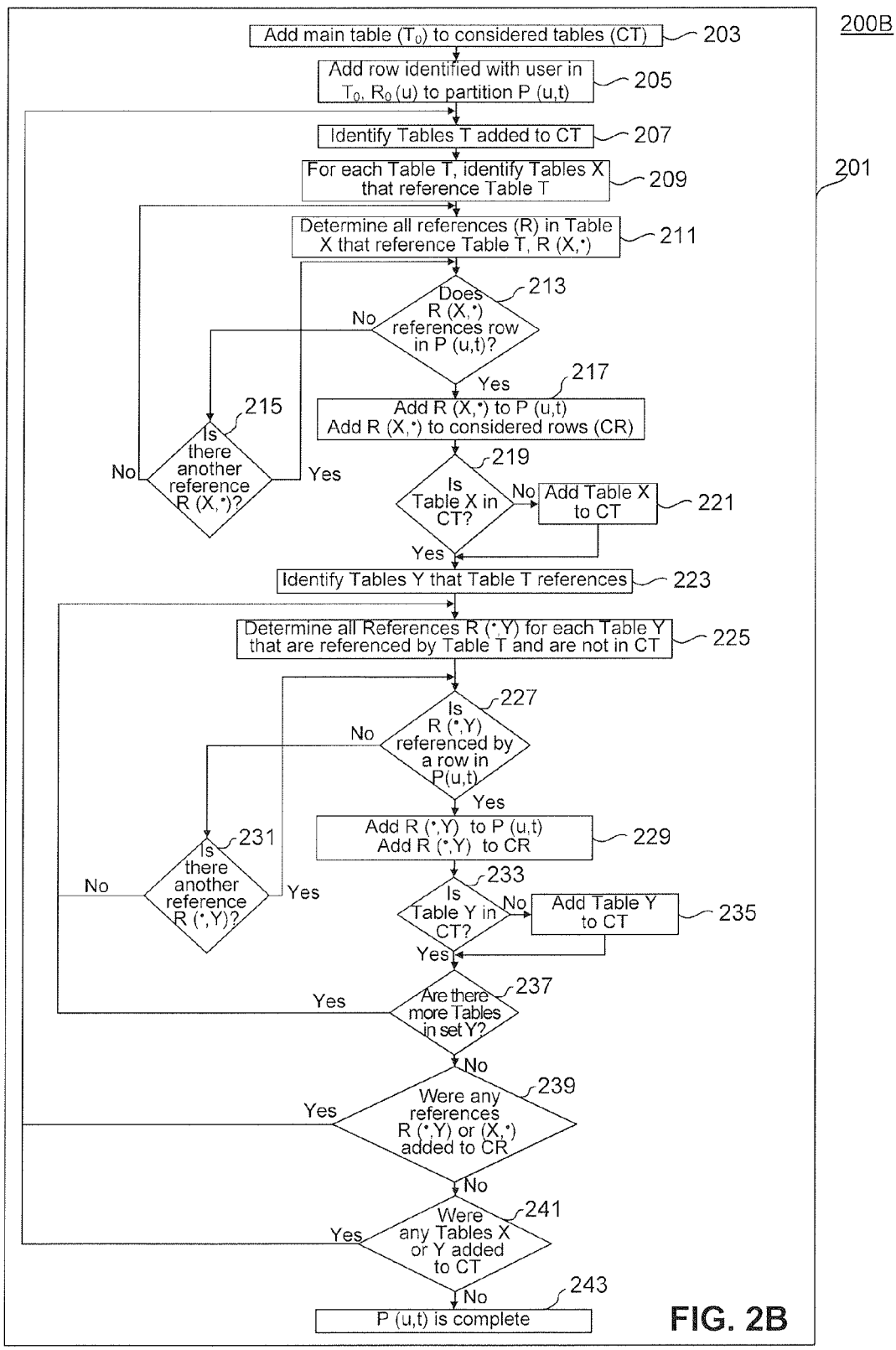
FIG. 2B is an exemplary embodiment 201 of an algorithm for partitioning data in a database, according to embodiments of the invention.

FIG. 2B according to an embodiment of the invention 201 illustrates a flowchart of a partition algorithm 201 used to determine a partition. For example, in an embodiment, a partition is defined as P(u,t), where function P defines a partition in application schema 125. The variable "u" defines a user, such as user 170. The variable "t" defines time, such as time instance "t".

In an embodiment, a relationship between tables in application schema 125 is defined as R(S, T), where "S" and "T" are tables. Table "S" references table "T" if "S" has a foreign key that references the primary key in table "T". Also, a row in table "S" (row "s") references a row in table "T" (row "t") if the value of the foreign key in row "s" is equal to the value of the primary key in row "t".

Initially, the main table, such as the User Table described above, is initialized as $T_0$. A primary key is set on a row identifying user 170 in the main table. In an exemplary embodiment, the primary key in the User Table is set on user identification column, such as, the UserID or OpenID.

In an embodiment, a row $r_0$ (u) in $T_0$ is a row associated with a user, such as user 170 in the User Table.

In an embodiment, the partition P(u,t), is determined using partition algorithm 201 described below and illustrated in the flow chart in FIG. 2A.

Let tables and rows in partition P(u,t) be selected as follows:

1. Let the set of "considered tables" CT be initially $T_0$ and let the set of "considered references" CR, be initially empty.
    Add $r_0$(u) to partition P(u, t).
2. For each reference R(X, •) that references a table in CT:
    Add all rows in Table X that reference a row in partition P(u, t) through R(X, •), are also in partition P(u, t).
    Add R(X, •) to CR.
    If Table X is not in CT, add Table X to CT.
3. For each reference R(•, Y) not in CR that is referenced by a table in CT:
    Add all rows in Table Y referenced by a row in partition P(u, t), to partition P(u, t).
    Add R(•, Y) to CR.
    If Table Y is not in CT, add Table Y to CT.
4. Repeat steps 2 and 3, until an iteration does not add any references to CR or tables to CT.

Partition algorithm 201 recursively iterates through tables and rows defined in application schema 125 until all rows and tables that belong to the partition P (u,t) are determined.

Going back to FIG. 2A, the flow chart illustrating partition algorithm 201 is described below.

At steps 203 and 205 partition algorithm 201 is initialized. At step 203, the main table, $T_0$ is added to considered tables (CT). At step 205, row $r_0$ (u) is added to partition P(u,t).

At step 207, all tables, in a set of Tables T that are included in the considered tables (CT) are identified. A person skilled in the art will understand that on the first iteration only table $T_0$ is included in the set of Tables T. In an embodiment, only tables that were added to considered tables (CT) by partition algorithm 201 during a previous iteration are included in the set of Tables T. After the set of Tables T is identified, partition algorithm 201 analyzes each Table T in the set of Tables T.

At step 209, a set of Tables X is identified. A set of Tables X consists of all tables that reference Table T.

At step 211, partition algorithm 201 analyzes each Table X in the set of Tables X. For each Table X, partition algorithm 201 determines all references R(X,•) in Table X that reference Table T.

At step 213, partition algorithm 201, for each reference R(X,•), determines whether the reference R(X,•) also references any row in the partition P(u,t). If reference R(X,•), references any row in the partition P(u,t), the flow chart proceeds to step 217, otherwise, the flow chart proceeds to step 215.

At step 215, partition algorithm 201 determines if there is another reference R(X,•) in Table X that references Table T. If another reference R(X,•) exists, then the flowchart proceeds to step 213 where the next reference R(X,•) is analyzed as described above. Otherwise, the flowchart proceeds to step 211. At step 211, all references in another Table T of the set of Tables are determined as described above.

Going back to step 217, if reference R(X,•) references a row in partition P(u,t), reference R(X,•) is added to partition P(u,t). Reference R(X,•) is also added to a set of considered references (CR).

At step 219, partition algorithm 201 determines if Table X is included in considered tables (CT). If Table X is not included in the considered tables (CT), Table X is added to considered tables (CT) at step 221.

Partition algorithm 201, proceeds to step 223 if Table X of step 219 was included in the considered tables (CT), or after step 221 described above.

After all Tables X in the set of Tables X are processed, the algorithm proceeds to step 223.

At step 223, a set of Tables Y is identified. The set of Tables Y includes all tables referenced by Table T of step 209. Partition algorithm 201 proceeds to step 225 where each Table Y in set of Tables Y is analyzed.

At step 225, partition algorithm 201 determines all references R(•,Y) in Table Y that are not included in considered references (CR) and that are referenced by Table T.

At step 227, partition algorithm 201 determines if each reference R(•,Y) is referenced by a row in partition P(u,t). If reference R(•,Y) is reference by a row in partition P(u,t), partition algorithm 201 proceeds to step 229. However, if reference R(•,Y) is not referenced by a row in partition P(u,t), partition algorithm 201 proceeds to step 231.

At step 231, partition algorithm 201 determines if there is another reference R(•,Y) in Table Y that is referenced by Table T. If the reference R(•,Y) does not exist, partition algorithm 201 returns to step 225. At step 225, the next Table Y, in the set of Tables Y is analyzed as described above. However, if another reference R(•,Y) exists in step 231, partition algorithm 201 proceeds to step 227. At step 227, the next reference R(•,Y) is analyzed as described above.

At step 229, partition algorithm 201 adds reference R(•,Y) of step 227 to the partition P(u,t). Reference R(•,Y) is also added to the list of considered references (CR).

At step 233, partition algorithm 201 determines if Table Y of step 225 is in the considered tables (CT). If Table Y is not in the considered tables (CT), partition algorithm 201 adds Table Y to considered tables (CT) at step 235. However, if Table Y is in the considered tables (CT) or was added to considered tables (CT) in step 235, partition algorithm 201 proceeds to step 237.

At step 237, partition algorithm 201 determines if there is another Table Y in the set of Tables Y that requires analysis. If another Table Y exists, partition algorithm 201 proceeds to step 225. At step 225, the next Table Y is analyzed as described above. However, if all Tables Y have been analyzed, partition algorithm 201 proceeds to step 239.

At step 239, partition algorithm 201 determines if there were any references R(X,•) or R(•,Y) added to considered references (CR) that were not in the set during the previous iteration. If new references were added, partition algorithm 201 proceeds to step 207 as described above. Otherwise, partition algorithm 201 proceeds to step 241.

At step 241, partition algorithm 201 determines if any Tables X or Tables Y were added to considered tables (CT) that were not there during the previous iteration. If additional tables were added, partition algorithm 201 proceeds to step 207 as described above. Otherwise, partition algorithm 201 proceeds to step 243.

At step 243, partition P(u,t) is complete.

Figure 2C:
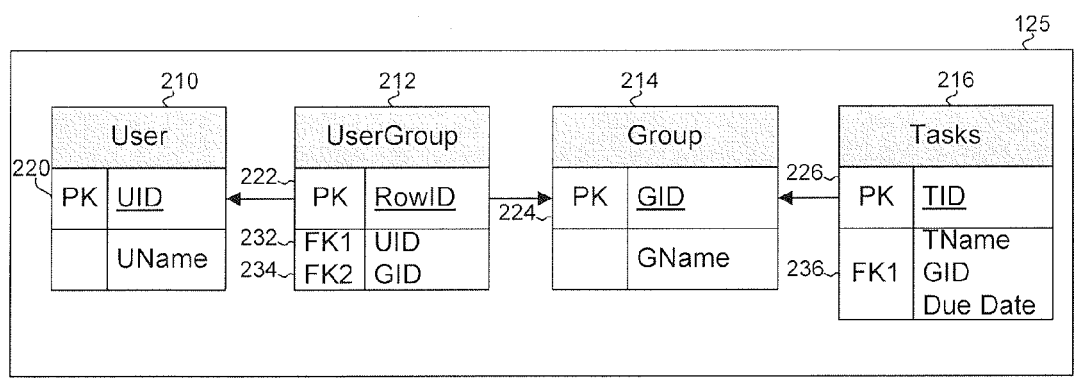
FIG. 2C is an exemplary embodiment 200C of a simplified application database schema according to embodiments of the invention.
Figure 2D:
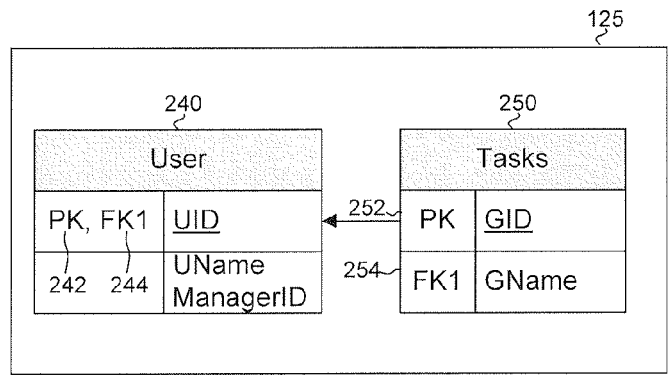
FIG. 2D is another exemplary embodiment 200D of a simplified application database schema according to embodiments of the invention.

FIG. 2B and FIG. 2C are exemplary embodiments of two application schemas 125. Each application schema 125 is operable to store data for a corresponding node database 152 used by node 130.

FIG. 2B is an exemplary embodiment of application schema 125 where a partition P(u, t) defines data belonging to user 170. The partition is defined to include data that includes a list of tasks for all groups where user 170 is a member. Application schema 125 comprises four tables: a User Table 210 (main table), a User Group Table 212, a Group Table 214 and a Task Table 216.

In an embodiment, User Table 210 is a main table that comprises two columns: column UName and column UID. Column UID uniquely identifies each user in User Table 210. A primary key 220 is set on the column UID.

Group Table 214 identifies the names of all groups. Group Table 214 comprises two columns: column GID and column GName. Group Table 214 includes a primary key 224 that is set on a column GID.

User Group Table 212 comprises three columns: column RowID, column UID and column GID. A primary key 222 is set on the column RowID. Primary key 222 indicates a reference to the column UID in User Table 210 and a reference to the column GID in Group Table 214. A foreign key 232 is set on the column UID and foreign key 234 is set on the column GID in Group Table 214. Foreign key 232 identifies a relationship with the column UID in User Table 210. Foreign key 234 identifies a relationship with the column GUI in Group Table 214.

Task Table 216 comprises four columns: column TID, column TName, column GID and column DueDate. A primary key 226 is set on the column TID. Primary key 226 identifies a reference to the column GID in Group Table 214. A foreign key 236 is set on the column GID. A foreign key 235 identifies a relationship with column GID in Group 214.

When central server system 110 applies partition algorithm 201 to application schema 125 described in FIG. 2B, a partition P(u,t) is determined for user 170. The partition P(u, t), comprises data that includes a list of tasks for every group that includes user 170 as a member.

FIG. 2C is another exemplary embodiment of application schema 125. Node database 152 corresponding to application schema 125 of FIG. 2C, allows users 170 to retrieve their tasks. However, users 170, who are managers, are allowed to retrieve tasks that belong to themselves, as well as tasks that belong to other members of their teams.

Application schema 125 comprises two tables: a User Table 240 (main table) and a Tasks Table 250. User Table 240 includes three columns: column UID, column UName and column ManagerID. A primary key 242 is set on column UID. A foreign key 244 is also set on column UID.

Tasks Table 250 includes three columns: column RowID, column UID and column Value. A primary key 252 is set on column RowID and references User Table 240. A foreign key 254 is set on column UID.

When central server system 110 applies partition algorithm 201 to application schema 125 described in FIG. 2C, a partition P(u,t) is determined for user 170. If user 170 is not a manager, P(u,t) includes data for a list of tasks associated only with user 170. However, if user 170 is a manager, P(u,t) includes data for a list of tasks for user 170 and for members of user's 170 group.

As described above, central database 122, illustrated in FIG. A, stores structured history of operations 126 made to each application data set 124. In an embodiment, structured history of operations 126 includes a complete history of data changes made to rows and tables in application data set 124. Structured history of changes 126 is stored by the time of arrival of each data change to central server system 110 from node 130.

A person skilled in the art will appreciate that as application schema 125, history of operations 126 is also not defined for a particular application data set 124. Rather, in an embodiment, history of operations 126 is stored as records in tables in central database 122 independently of any individual application data set 124. In an embodiment, history of operations 126 is stored as a time stamped log of operations in Changes Table 262, RowChanges Table 263, RowSubordinates Table 264, Rows Table 265, RowSubordinateChanges Table 266 and Tables Table 267 as illustrated in FIG. 2A.

Each data change is a single row operation on the tables defined by application schema 125. Each row change includes a list of linked rows associated with the row being changed in application schema 125. For example, in an embodiment where a row is deleted from a table, the list of linked rows will include rows that were unaltered by the delete operation, but that are no longer members of the partition as a consequence of the delete operation. In an embodiment where a row is updated in a table, the list of linked rows will include the representations of the updated row before and after the update. The list of linked rows is stored in tables RowSubordinates 264 and RowSubordinateChanges 266.

3. Communication Between Server and Nodes

A. Initializing the Application Database on a Node

As described above, node 130 stores data in local RDBMS 150. In an embodiment, local RDBMS 150 is operable to run a database management system such as SQLite. Each local RDBMS 150 hosts node database 152 for corresponding database application 156.

If node 130 does not include node database 152 for application 156, node 130 is operable to download node database 152 from central server system 110 or from another server.

Figure 3A:
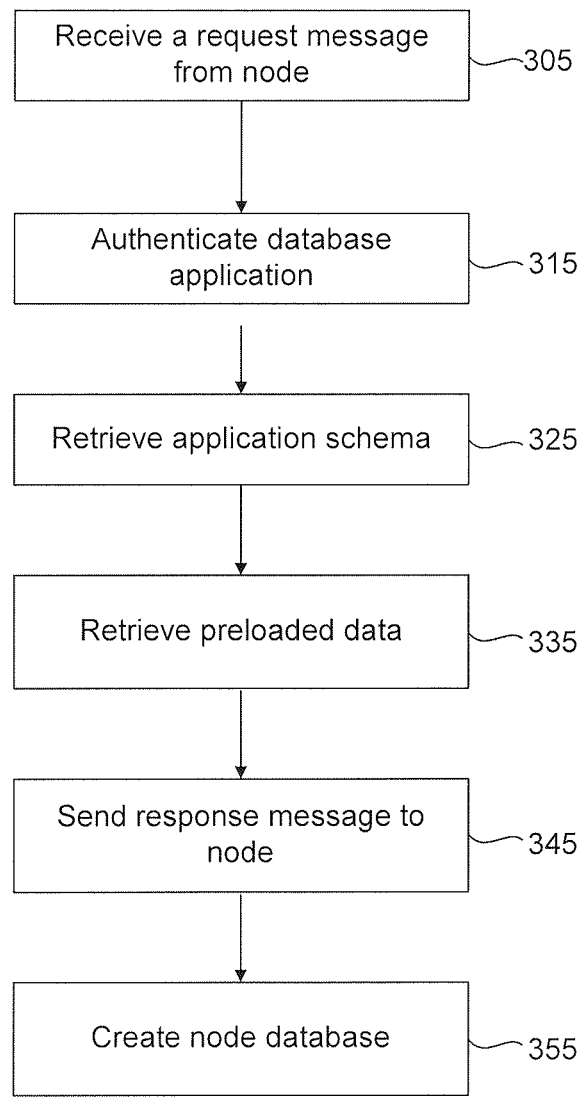
FIG. 3A is a flowchart of an exemplary embodiment 300A illustrating the steps by which a node is operable to create an application database by downloading an application schema from the central server system.

FIG. 3A is a flowchart illustrating an exemplary embodiment 300A, of central server system 110 processing a request message from node 130 that creates node database 152 on node 130. The flowchart is described using components of FIG. 1.

At step 305, central server system 110 receives a request message from node 130 via communication network 160. The request message contains a request for application schema 125 associated with database application 156.

At step 315, central server system 110 authenticates database application 156. The central server system 110 determines whether the application schema 125 for database application 156 exists in central database 122. If the application schema 125 exists, the flow chart proceeds to step 325, otherwise, the flowchart ends.

At step 325, central server system 110 retrieves application schema 125 from Jobs Table 270 and JobsSteps Table 272 of the central database 122. Application schema 125 describes tables and relationships among the tables for node database 152. As described above, node 130 uses application schema 125 to create a corresponding node database 152.

At step 335, central server system 110 retrieves any preloaded data associated with node database 152. The preloaded data may be posted to central server system 110 by an application developer.

At step 345, central server system 110 sends a response message to node 130. The response message contains application schema 125 and the preloaded data retrieved in step 335. In an embodiment, the retrieved application schema 125 and node 130 are written into a JSON document. The JSON document is sent as a part of the response message. A person skilled in the art knows how to represent data in JSON documents and send the JSON documents using communication network 160.

In another embodiment, application schema 125 and the preloaded data are sent to node 130 as two distinct response messages.

At step 355, node 130 receives the response message. Node 130 creates node database 152 from application schema 125 downloaded from the central server system. Node 130 also populates node database 152 with the preloaded data.

B. Replicating Data Stored on the Central Server System

When data is manipulated or changed by user 170 on node 130, node 130 posts a message comprising of the data changes to central server system 110. In an embodiment, node 130 posts data changes to central server system 110 every time data is committed by user 170. A person skilled in the art will understand how data is committed on node 130. Central server system 110 receives messages that include data changes from multiple nodes 130. Data changes are stored in central database 122 as described above. Central database 122 stores changes for multiple application data sets 124 and for multiple nodes 130 that post changes to central server system 110.

In an embodiment, multiple nodes 130 send request messages to central server system 110. Each request message includes a request for data from central server system 110 by a particular user 170 for a particular database application 156. The update request message is a request for data from a particular application data set 124. In response to the update request message, central server system 110 sends an update response message to the requesting node 130. The update response message includes data for a particular user 170. The data includes a list of data changes made to a partition associated with the user 170 by multiple users 170 from a predetermined point in time.

According to an embodiment, nodes 130 send update request messages to central server system 110 at predetermined times. In an embodiment, nodes 130 send an update request message at startup. In another embodiment, nodes 130 send an update request message only at times specified by central server system 110.

Figure 3B:
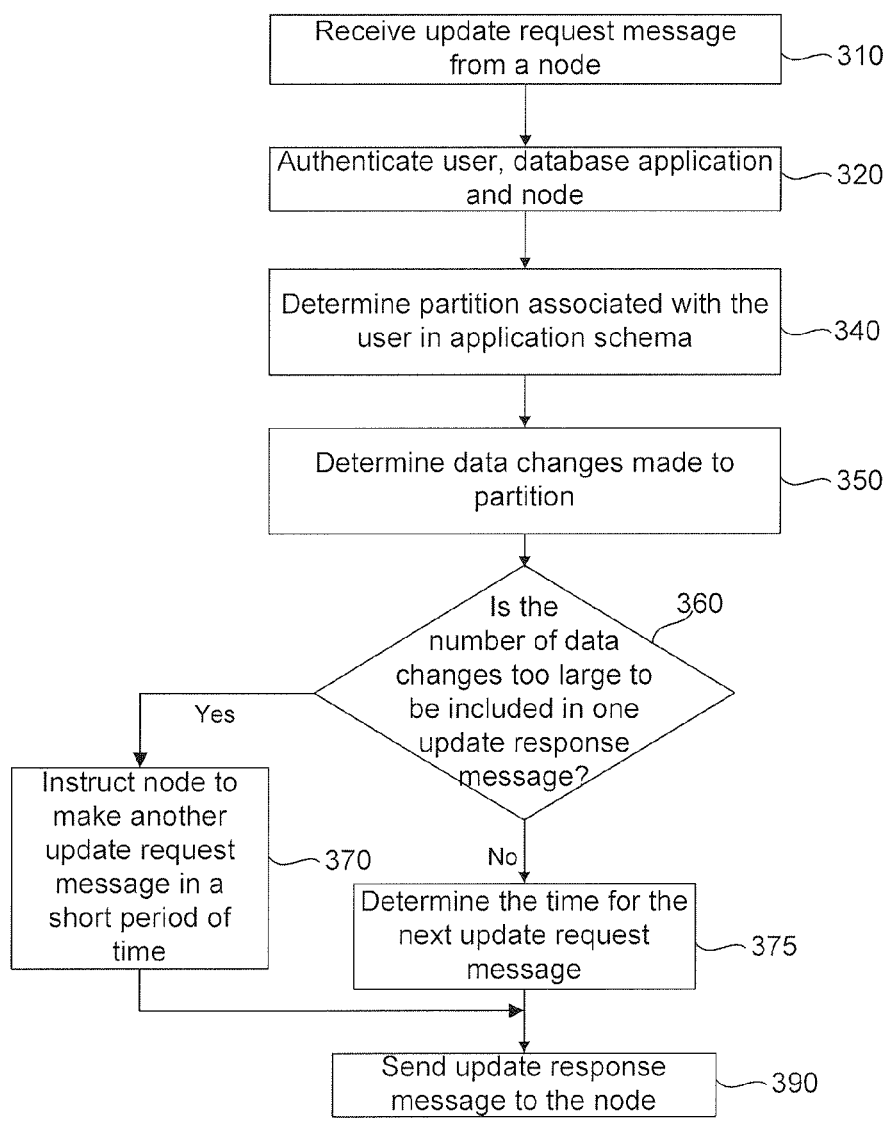
FIG. 3B is a flowchart of an exemplary embodiment 300B illustrating the steps by which a central server system is operable to determine data that is sent to a node in an update response message.

FIG. 3B is a flowchart illustrating an exemplary embodiment 300 of central server system 110 processing an update request message received from node 130. The flowchart is described using components of FIG. 1.

At step 310, central server system 110 receives an update request message from node 130 via communication network 160. The update request message includes user identification, such as, but not limited to, an Open ID userID, associated with the corresponding user 170. The update request message also identifies node 130 that has sent the update request message and database application 156.

At step 320, central server system 110 authenticates the update request message. In an embodiment, central server system 110 determines whether user 170 has permission to access application data set 124. An authentication is performed by, for example, authenticating userID associated with user 170 via an OpenID provider, or matching the user name against the main table, such as the User Table in central database 122. At step 320, central server system also determines whether node 130 is registered with the central server system 110, and whether the application data set 124 exists for database application 156. The authentication is performed based on the node identifier associated with node 130 and the application identifier associated with database application 156. If central server system 110 cannot authenticate user 170 the flowchart ends.

Figure 4:
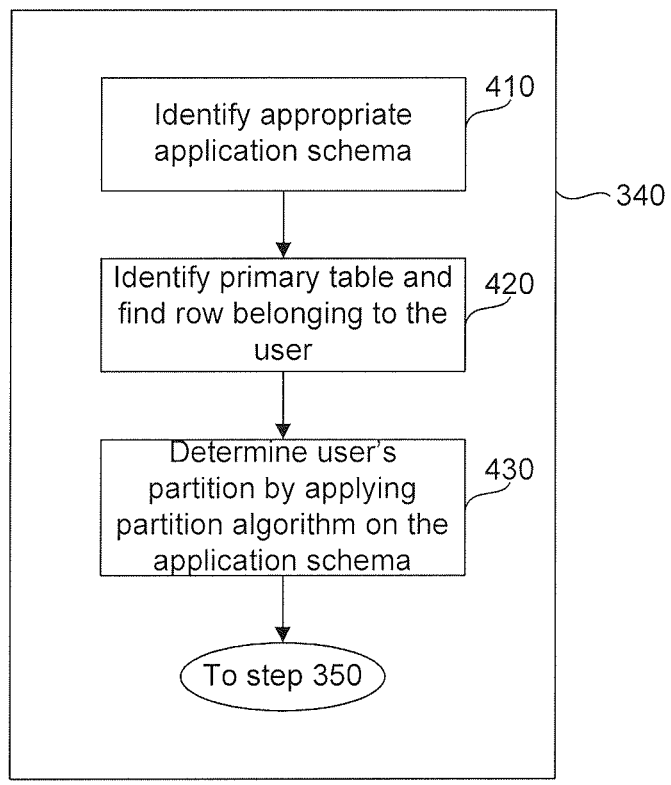
FIG. 4 is a flowchart of an exemplary embodiment 400 illustrating the steps of determining a partition for a particular user.

At step 340, central server system 110 determines a partition P(u,t) for user 170 in the appropriate application schema 125. FIG. 4 is a flowchart illustrating an exemplary embodiment 400 by which central server system 110 determines a partition for user 170.

At step 410, central server system 110 identifies the application data set 124 stored in central database 122 for which the node 130 has requested data. In an embodiment, the application database identification associated with a database application 156 is included in the update request message. In an embodiment, this step may also be performed in conjunction with an authentication step 320.

At step 420, central server system 110 identifies the main table in application schema 125. In an embodiment, main table, such as the User Table, comprises user's 170 data, such as, for example, user identification and user name. The User Table also includes a primary key which is set on the user identification, such as a UserID or an OpenID.

At step 430, central server system 110 determines a partition P(u,t) for user 170. Central server system 110 applies partition algorithm 201 to application schema 125. Partition algorithm 201 begins to iterate through tables in application schema 125 that are linked by the primary and foreign keys. As described above, partition algorithm 201 initially begins to iterate through the main table in application schema 125. After central server system 110 applies partition algorithm 201, the partition P(u,t) for user 170 is determined. A determined partition is a set of rows in tables in application schema 125 that store data for user 170. As described above, the partition corresponds to a set of data in application schema 125 that holds data that was posted by multiple users 170.

Figure 5:
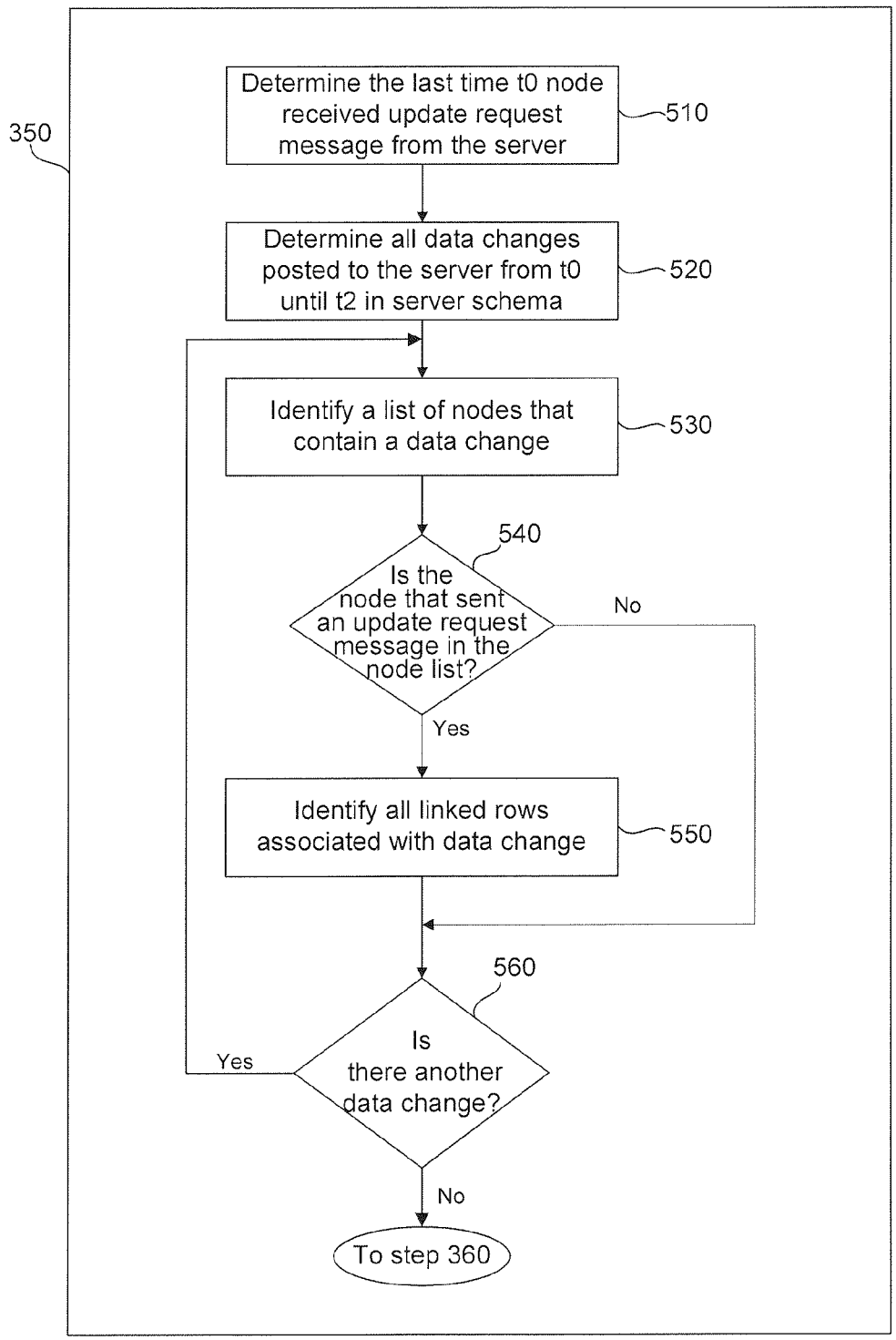
FIG. 5 is a flowchart of an exemplary embodiment 500 illustrating the steps of determining data changes posted to a partition.

After central server system 110 determines the partition for user 170, central server system 110 proceeds to step 350. At step 350, central server system 110 accesses structured history of operations 126 stored in central database server 122 and retrieves data changes for tables and rows that were identified in the partition of step 340. FIG. 5 is a flowchart illustrating an exemplary embodiment 500 by which central server system 110 determines the data changes for the partition of step 340.

At step 510, central server system 110 identifies the time that central server system 110 received a previous update response message for user 170. In an embodiment, the identified time is designated as time t0.

In an embodiment, time t0 is specific to node 130. As described above, user 170 is able to access central server system 110 through multiple nodes 130. When user 170 accesses central server system 110 from multiple nodes 130, each node 130 may have a different set of data associated with user 170. Central server system 110, therefore, must update a particular node 130 with all data changes that were posted to the partition determined in step 340, since the last time that particular node 130 (i.e. the requesting node from step 310) sent a previous update response message. Therefore, if user 170 uses multiple nodes 130, each node 130 may have a different time t0, but in the corresponding operation only the requesting node is being updated.

In an embodiment, if central server system 110 determines that the current update request message is the first update request message for user 170, central server system 110 sets time t0 to the beginning of time. A person skilled in the art will understand that the term "beginning of time" corresponds to an initial state of the application database. When t0 is set to the beginning of time, central server system 110 is operable to retrieve all changes made to a partition associated with user 170 that were posted to central server system 110. In another embodiment, central server system 110 is operable to send preloaded data in an update response message as described below in step 380.

In another embodiment, node database 152 hosted on node 130 may enter a corrupted state. A person skilled in the art will appreciate that an application database that enters a corrupted state must be re-initialized. A person skilled in the art will also understand that a corrupted database may result for a variety of reasons, such as a SQL error, a physical memory corruption, a race condition, or other non-deterministic events.

In an embodiment, whenever central server system 110 receives an update request message from a corrupted node 130, central server system 110 sets time t0 to the beginning of time, as described above. When time t0 is set to beginning of time, central server system 110 is operable to retrieve all changes for the partition associated with user 170 that posted to central server system 110. The corrupted node database 152 is then re-initialized with valid data.

At step 520, central server system 110 determines all data changes that were posted to central server system 110 for database application 156, since time t0.

In an embodiment, central server system 110 identifies all data changes that were posted for database application 156 between time t0 and time t2. Time t2, is the time that central server system 110 received the update request message of step 310.

As described above, data changes for each node database 152 are stored in central database 122 as structured history of operations 126. The list of data changes specific to the row changes in node database 152 are stored in Row-Changes Table 263. In an embodiment, a row change may include an INSERT, DELETE or UPDATE operations. Therefore, in an UPDATE operation, the row change identifies the row data before and after the UPDATE operation. In an INSERT operation, the row change identifies only the added values. In a DELETE operation, the row change identifies the primary key of the row that was deleted. RowChanges Table 263 references RowSubordinateChanges Table 266 to determine a Table ID and a Row ID in the application schema 125 that is associated with a particular row change. In an embodiment, RowSubordinateChanges Table 266 holds a complete list of linked pairs of rows and their associated tables as illustrated in the central database 122 schema in FIG. 2A. Once all data changes stored in RowChanges Table 263 for the relevant time period are identified, central server system 110 proceeds to step 530.

At step 530, partition algorithm 201 is applied to RowChanges Table 263. In an embodiment, variable "u" in the partition algorithm P(u,t) defines a Row ID that is associated with the data change and variable "t" defines a time instance "t". Partition algorithm 201 generates a partition P(u,t) that identifies a list of nodes 130 that are affected by a particular row change. In an embodiment, the list of users 170 may be derived from a list of nodes 130 as illustrated in central database 122 schema in FIG. 2A.

At step 540, central server system 110 determines whether node 130 that has sent the update request message is included in the list of nodes determined in step 530. If node 130 is in the list, central server system 110 proceeds to step 550, otherwise the central server system 110 proceeds to step 560.

At step 550, central server system 110 determines the linked rows associated with the row change. The linked rows illustrate the before and after state of a table where a row change occurred. In an embodiment the linked rows are stored in RowSubordinateChanges Table 266 illustrated in FIG. 2A.

When central server system 110 determines the linked rows, the operations on these linked rows are included in the JSON documents 128. Central server system 110 sends JSON documents 128 to node 130 as part of the update response message.

After central server system 110 completes analyzing the row change, the central server system 110 proceeds to step 560. At step 560, central server system 110 determines if there is another row change that requires an analysis performed in steps 530 through 550. If another row change exists, central server system 110 proceeds to step 530 and repeats steps 530 through 550 for the next row change. However, if central server system 110 has completed analyzing all row changes in the data change, server system 110 proceeds to step 360.

At step 360, central server system 110 determines whether the update response message exceeds a predetermined size. In an embodiment, central server system 110 determines the size of the update response message by identifying the number of operations that are included in the update response message between time t0 and time t2. Central server system 110 compares the number of row changes against the maximum predefined value. A person skilled in the art will understand that a maximum value may be defined or set by central server system 110.

Additionally, a person skilled in the art will appreciate the reasons for restricting the size of the update response message. For example, a large response message may take too long to download to node 130. The lengthy download time may cause vulnerability on node 130, such as a download interruption. If the message download is interrupted, node 130 may seek to re-establish a connection with central server system 110, and resume the download. In an embodiment, the integrity of a large update response message may also be compromised as it travels via communication network 160.

In an embodiment, step 360 may be implemented before step 560.

If the number of row changes is less than the maximum value, central server system 110 proceeds to step 375.

At step 375, central server system 110 determines the next time the requesting node 130 may send an update request message to central server system 110. In conventional systems, the application operable on a mobile device determines the frequency with which the mobile device is operable to make update requests to the central server system. For example, the request may be made based on the user's preference or configured by an application developer.

Unlike conventional systems, in an embodiment, central server system 110 determines when the requesting node 130 may send the next update request message. The determination is based on the load of the central server system 110, the amount of data that is intended for user 170 using node 130, and/or frequency with which multiple users 170 post data in partition of step 340.

Therefore, if data is being posted frequently to central server system 110, central server system 110 may instruct node 130 to send another update request message fairly quickly. However, if data is posted to central server system 110 infrequently, central server system 110 may instruct node 130 to wait for a longer period of time before sending another update request message.

After central server system 110 determines the time for the next update request message, central server system 110 sets time t0 to time t2.

At step 390, central server system 110 formats the update response message. The update response message includes operation log 156 that was collected in step 350 and a time for the next update message request determined in step 375. The flowchart ends at step 390 when central server system 110 sends the update response message to node 130.

Going back to step 360, if central server system 110 determines that the number of row changes exceeds the maximum allowable limit for row changes that can be included in the update response message, central server system 110 proceeds to step 370.

At step 370, central server system 110 prepares to send only the number of row changes that are equal to or less than the maximum allowable limit. Central server system 110, therefore instructs node 130 to send another update request message within a short period of time (the time interval is indicated in the instruction), in order to retrieve the row changes that were not included in the current update response message.

In an embodiment, central server system 110 also identifies the time that the last row change included in the current update response message arrived at the central server system 110 as time t. The central server system sets time t0 to time t. This way, in response to the next update request message from the same node, central server system 110 is operable to determine changes made to the partition of step 340 beginning with data changes at time t, which is, specifically, the last row change included in the update response message to node 130.

After central server system 110 completes step 370, central server system 110 proceeds to step 390 as described above.

C. Processing Replicated Data on a Node

Figure 6:
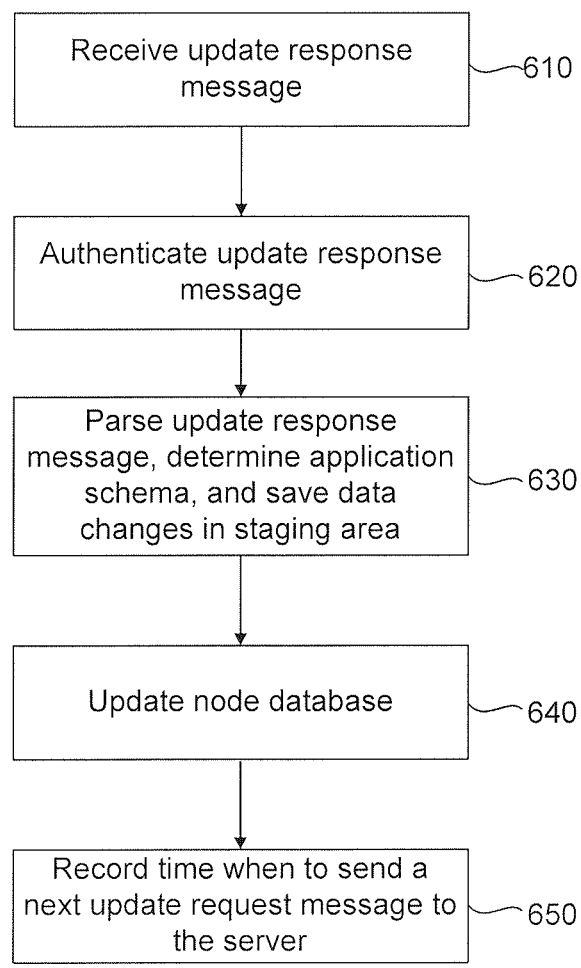
FIG. 6 is a flowchart of an exemplary embodiment 600 illustrating the steps of updating a node with the data from the central server system.

FIG. 6 is an exemplary embodiment 600 of a flowchart illustrating the steps by which node 130 processes update response message from central server system 110.

At step 610, node 130 receives the update response message from central server system 110 via communication network 160.

At step 620, node 130 authenticates the update response message. Node 130 determines whether the data in the update response message is for a corresponding user 170 and the requested database application 156.

At step 630, node 130 parses the update response message. Node 130 retrieves the operation history containing the row changes in the update response message. In an embodiment, the operation history is retrieved from the JSON document included in the update response message. The operation history is saved in a staging area (not shown) at node 130. In an embodiment, the staging area is a table included in node database 152. A person skilled in the art will appreciate that the operation history is stored in the staging area for efficiency purposes. For example, in the staging area, the operation log may be stored quickly and with minimal processing. This ensures that the data processing does not become a limiting factor for node 130 in a fast communication network 160.

At step 640, node 130 applies the data in the staging area to the tables and rows in node database 152. After node 130 completes updating the partition of step 640, the data from the JSON document is deleted from the staging area.

At step 650, node 130 records the time for the next update request determined in steps 370 or step 375. Node 130 is operable to send another update request message to central server system 110 at this determined time. In an embodiment, step 650 can be made at any time after step 620.

4. Example Computer System Implementation

Figure 7:
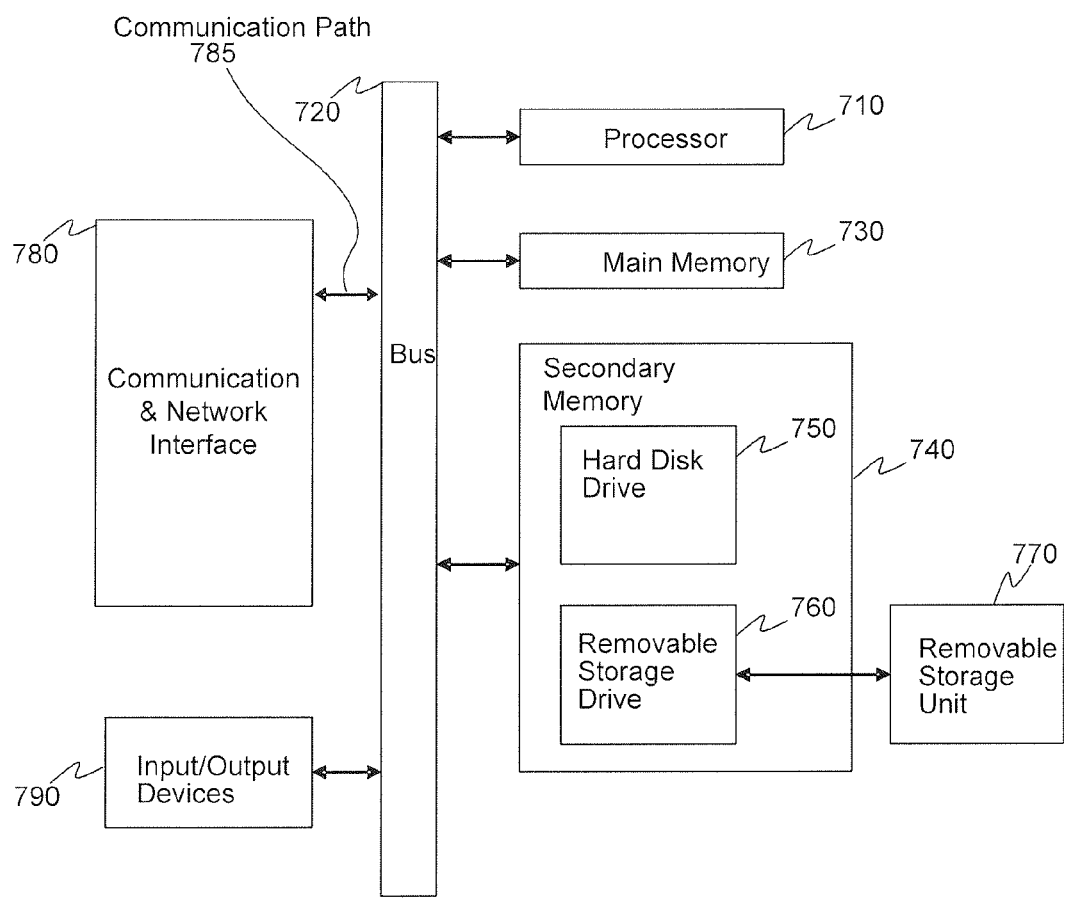
FIG. 7 is an exemplary operating environment 700 of a computer system in which embodiments of the invention may be implemented.

Various aspects of the invention can be implemented by software, firmware, hardware, or a combination thereof. FIG. 7 illustrates an example computer system 700 in which the invention, or portions thereof, can be implemented as computer-readable code. For example, the methods illustrated by flowcharts described above can be implemented in system 700. Various embodiments of the invention are described in terms of this example computer system 700. After reading this description, it will become apparent to a person skilled in the relevant art how to implement the invention using other computer systems and/or computer architectures.

Computer system 700 includes one or more processors, such as processor 710. Processor 710 can be a special purpose or a general purpose processor. Processor 710 is connected to a communication infrastructure 720 (for example, a bus or network).

Computer system 700 also includes a main memory 730, preferably random access memory (RAM), and may also include a secondary memory 740. Secondary memory 740 may include, for example, a hard disk drive 750, a removable storage drive 760, and/or a memory stick. Removable storage drive 760 may comprise a floppy disk drive, a magnetic tape drive, an optical disk drive, a flash memory, or the like. The removable storage drive 760 reads from and/or writes to a removable storage unit 770 in a well known manner. Removable storage unit 770 may comprise a floppy disk, magnetic tape, optical disk, etc. which is read by and written to by removable storage drive 760. As will be appreciated by persons skilled in the relevant art(s), removable storage unit 770 includes a computer usable storage medium having stored therein computer software and/or data.

In alternative implementations, secondary memory 750 may include other similar means for allowing computer programs or other instructions to be loaded into computer system 700. Such means may include, for example, a removable storage unit 770 and an interface 720. Examples of such means may include a program cartridge and cartridge interface (such as that found in video game devices), a removable memory chip (such as an EPROM, or PROM) and associated socket, and other removable storage units 770 and interfaces 720 which allow software and data to be transferred from the removable storage unit 770 to computer system 700.

Computer system 700 may also include a communications and network interface 780. Communications interface 780 allows software and data to be transferred between computer system 700 and external devices. Communications interface 780 may include a modem, a communications port, a PCMCIA slot and card, or the like. Software and data transferred via communications interface 780 are in the form of signals which may be electronic, electromagnetic, optical, or other signals capable of being received by communications interface 780. These signals are provided to communications interface 780 via a communications path 785. Communications path 785 carries signals and may be implemented using wire or cable, fiber optics, a phone line, a cellular phone link, an RF link or other communications channels.

The network interface 780 allows the computer system 700 to communicate over communication networks or mediums such as LANs, WANs the Internet, etc. The network interface 780 may interface with remote sites or networks via wired or wireless connections.

In this document, the terms "computer program medium" and "computer usable medium" are used to generally refer to media such as removable storage unit 770, removable storage drive 760, and a hard disk installed in hard disk drive 750. Signals carried over communications path 785 can also embody the logic described herein. Computer program medium and computer usable medium can also refer to memories, such as main memory 730 and secondary memory 740, which can be memory semiconductors (e.g. DRAMs, etc.). These computer program products are means for providing software to computer system 700.

Computer programs (also called computer control logic) are stored in main memory 730 and/or secondary memory 740. Computer programs may also be received via communications interface 780. Such computer programs, when executed, enable computer system 700 to implement the invention as discussed herein. In particular, the computer programs, when executed, enable processor 710 to implement the processes of the invention, such as the steps in the methods illustrated by flowcharts 300 of FIG. 3, 400 of FIG. 4, 500 of FIG. 5 and 600 of FIG. 6 discussed above. Accordingly, such computer programs represent controllers of the computer system 700. Where the invention is implemented using software, the software may be stored in a computer program product and loaded into computer system 700 using removable storage drive 760, interface 720, hard drive 750 or communications interface 780.

The computer system 700 may also include input/output/display devices 790, such as keyboards, monitors, pointing devices, etc.

The invention is also directed to computer program products comprising software stored on any computer useable medium. Such software, when executed in one or more data processing device(s), causes a data processing device(s) to operate as described herein. Embodiments of the invention employ any computer useable or readable medium, known now or in the future. Examples of computer useable mediums include, but are not limited to primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The invention can work with software, hardware, and/or operating system implementations other than those described herein. Any software, hardware, and operating system implementations suitable for performing the functions described herein can be used.

CONCLUSION

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method for retrieving data from a central database for a mobile device, comprising:

receiving, at the central database, an update request message for the data from a user at the mobile device, wherein the update request message comprises a node identification and an application identification, wherein the node identification identifies the mobile device and the application identification identifies a database application hosted by the central database;

accessing an application schema in the central database using the application identification, wherein the application schema defines tables of the database application and relationships between the tables of the database application;

determining a first partition of the application schema based on the user, wherein the first partition includes a set of rows in the application schema that belong to the user;

identifying a set of data changes in a history of operations based on the first partition and a point in time, wherein the history of operations is stored in the central database, and the identified set of data changes describe one or more data changes made to the application schema for the user after the point in time;

determining a second partition of the history of operations based on a data change in the identified set of data changes for the first partition, wherein the second partition identifies a set of nodes affected by the data change;

in response to determining the mobile device is in the set of nodes of the second partition, determining a set of rows in the application schema corresponding to the data change;

identifying a set of operations associated with the determined set of rows in the application schema corresponding to the data change;

determining the set of operations is small enough to be included in an update response message; and transmitting the update response message to the mobile device to synchronize the data at the central database with the mobile device, wherein the update response message includes the determined set of operations.

2. The method of claim 1, further comprising:
formatting the set of operations associated with the determined set of rows in the application schema corresponding to the data change in the response message.

3. The method of claim 1, further comprising:
identifying the point in time based on when the node sent a previous update request message.

4. The method of claim 1, wherein at least one table in the application schema comprises at least one primary key and at least one foreign key, and the determining the first partition comprises determining if at least one primary key is equal to at least one foreign key.

5. The method of claim 1, wherein the set of rows in the first partition includes a row for one user of the node, a group of users, or a subset of a group of users.

6. The method of claim 1, further comprising:
determining a frequency with which data changes post to the central database;
determining a second point in time the node is operable to send a next update request message based on the frequency; and
transmitting the second point in time to the node.

7. A central server system for replicating data to a mobile device, comprising: a central database;

a receiver, configured to receive an update request message from a user at the mobile device, wherein the update request message comprises a node identification and an application identification, wherein the node identification identifies the mobile device and the application identification identifies a database application hosted by the central database;

a memory, configured to store an application schema and a history of operations, wherein the application schema defines tables of the database application and relationships between the tables of the database application, and the history of operations describe data changes made to the application schema;

a processor, configured to: determine a first partition of the application schema based on the user, wherein the first partition includes a set of rows in the application schema that belong to the user;

identifying a set of data changes in the history of operations based on the first partition and a point in time, wherein the identified set of data changes describe one or more data changes made to the application schema for the user after the point in time;

determine a second partition of the history of operations based on a data change in the identified set of data changes for the first partition, wherein the second partition identifies a set of nodes affected by the data change;

in response to determining the mobile device is in the set of nodes of the second partition, determining a set of rows in the application schema corresponding to the data change;
identifying a set of operations associated with the determined set of rows in the application schema corresponding to the data change;
determining the set of operations is small enough to be included in an update response message; and
a transmitter, configured to transmit the update response message to the mobile device to synchronize the data at the central database with the mobile device, wherein the update response message includes the determined set of operations.

8. The system of claim 7, wherein the processor is further configured to format the set of operations associated with the determined set of rows in the application schema corresponding to the data change in the response message.

9. The system of claim 7, wherein at least one table in the application schema further comprises at least one primary key and at least one foreign key, and the processor is further configured to determine the first partition by determining if at least one primary key is equal to at least one foreign key.

10. The system of claim 7, wherein the set of rows in the first partition includes a row for one user of the node, a group of users, or a subset of a group of users.

11. The system of claim 7, wherein the processor is further configured to:
determine a frequency with which data changes post to the central database; and
determine a second point in time the node is operable to send a next update request message based on the frequency; and
wherein the transmitter is further configured to transmit the second point in time to the node.

12. An article of manufacture including a non-transitory computer-readable storage medium having instructions stored thereon that, when executed by a computing device, cause said computing device to perform operations comprising:
receiving an update request message for data from a user at a mobile device, wherein the update request message comprises a node identification and an application identification, wherein the node identification identifies the mobile device and the application identification identifies a database application hosted by a central database;
accessing an application schema in the central database using the application identification, wherein the application schema defines tables of the database application and relationships between the tables of the database application;
determining a first partition of the application schema based on the user, wherein the first partition includes a set of rows in the application schema that belong to the user;
identifying a set of data changes in a history of operations based on the first partition and a point in time, wherein the history of operations is stored in the central database, and the identified set of data changes describe one or more data changes made to the application schema for the user after the point in time;
determining a second partition of the history of operations based on a data change in the identified set of data changes for the first partition, wherein the second partition identifies a set of nodes affected by the data change;
in response to determining the mobile device is in the set of nodes of the second partition, determining a set of rows in the application schema corresponding to the data change;
identifying a set of operations associated with the determined set of rows in the application schema corresponding to the data change;
determining the set of operations is small enough to be included in an update response message; and
transmitting the update response message to the mobile device to synchronize the data at the central database with the mobile device, wherein the update response message includes the determined set of operations.

13. The article of manufacture of claim 12, the operations further comprising:
formatting the set of operations associated with the determined set of rows in the application schema corresponding to the data change in the response message.

14. The article of manufacture of claim 12, the operations further comprising identifying the point in time based on when the node sent a previous update request message.

15. The article of manufacture of claim 12, wherein at least one table in the application schema comprises at least one primary key and at least one foreign key, and the determining the first partition comprises determining if at least one primary key is equal to at least one foreign key.

16. The article of manufacture of claim 12, wherein the set of rows in the first partition includes a row for one user of the node, a group of users, or a subset of a group of users.

17. The article of manufacture of claim 12, further comprising:
determining a frequency with which data changes post to the central database;
determining a second point in time the node is operable to send a next update request message based on the frequency; and
transmitting the second point in time to the node.

18. The method of claim 1, wherein the application schema is stored in a set of application-independent tables in the central database.

19. The method of claim 1, wherein the application schema is one of a plurality of application schemas stored in a table of the central database.

20. The method of claim 1, wherein the central database stores the application schema and data changes to the application schema without application specific code.

21. The method of claim 1, wherein the first partition of the application schema identifies data belonging to a user.

22. The method of claim 1, wherein the node is a mobile device.

23. The method of claim 1, wherein the application identification also identifies an application stored at the node for which the database application stores the data.

24. The method of claim 1, wherein the determining the first partition of the application schema on the user comprises combining the set of rows in the application schema based on the relationships between the tables of the database application.

25. The method of claim 1, wherein the first partition is shared by a set of nodes associated with the database application.

26. The system of claim 7, wherein the processor is further configured to:
determine the first partition of the application schema based on the user by combining the set of rows in the application schema based on the relationships between the tables of the database application.

27. The system of claim 7, wherein the first partition is shared by a set of nodes associated with the database application.

28. The method of claim 1, wherein the determining the first partition of the application schema based on the user comprises recursively iterating through the application schema.

29. The method of claim 1, further comprising;
   determining the update response message is less than a predetermined size.

30. The method of claim 1, wherein the determining the second partition of the row change table based on the row change in the set of identified row changes comprises recursively iterating through the row change table.

31. The method of claim 2, wherein the formatting comprises storing the set of data change operations in a text document.

* * * * *